United States Patent [19]

Escaravage

[11] Patent Number: 4,840,403

[45] Date of Patent: Jun. 20, 1989

[54] DEVICE FOR ADJUSTING THE POSITION OF A STRAP RETURN ELEMENT, IN PARTICULAR OF A SAFETY BELT FOR AN AUTOMOBILE VEHICLE

[75] Inventor: Gerard Escaravage, Valentigney, France

[73] Assignee: Ecia - Equipements et Composants pour L'Industrie Automobile, Audincourt, France

[21] Appl. No.: 195,339

[22] Filed: May 18, 1988

[30] Foreign Application Priority Data

May 27, 1987 [FR] France ............................. 87 07509

[51] Int. Cl.$^4$ ............................................. B60R 22/20
[52] U.S. Cl. ................................... 280/808; 280/804; 297/483
[58] Field of Search ...................... 280/804, 808, 801; 297/483

[56] References Cited

U.S. PATENT DOCUMENTS

| 4,466,666 | 8/1984 | Takada | 280/808 |
| 4,522,426 | 6/1985 | Weiman | 280/808 |
| 4,656,391 | 1/1986 | Kawai | 280/804 |

FOREIGN PATENT DOCUMENTS 0086633 10/1983 European Pat. Off. .
3400214  6/1986 Fed. Rep. of Germany .
8602654 10/1986 Fed. Rep. of Germany .
1599643 10/1981 United Kingdom .

Primary Examiner—Richard A. Bertsch
Attorney, Agent, or Firm—Sughrue, Mion, Zinn, Macpeak and Seas

[57] ABSTRACT

The device is of the type comprising a guide rail (1) mounted on the post (2) of the vehicle and on which is movable the strap return element (3). The return element comprises a first planar portion (8) from which extend two wings (9) disposed on each side of the guide rail (1) and between which wings is provided a blocking plate (11) which extends behind the rail, is downwardly inclined toward the rear side of the rail and cooperates with locking means (12) provided on the rear side of the rail for locking the strap return element (3) in position. Elastic means (13) are provided for biasing the blocking plate (11) to the locking position and the first planar portion (8) of the strap return element (3) to a position in which it bears against the front side of the rail (1). The strap return element includes a second portion (14) which is angularly offset relative to the first portion (8) and which is actuatable by a user for disengaging the blocking plate (11) from the locking means (12) and thereafter shifting the strap return element (3).

7 Claims, 1 Drawing Sheet

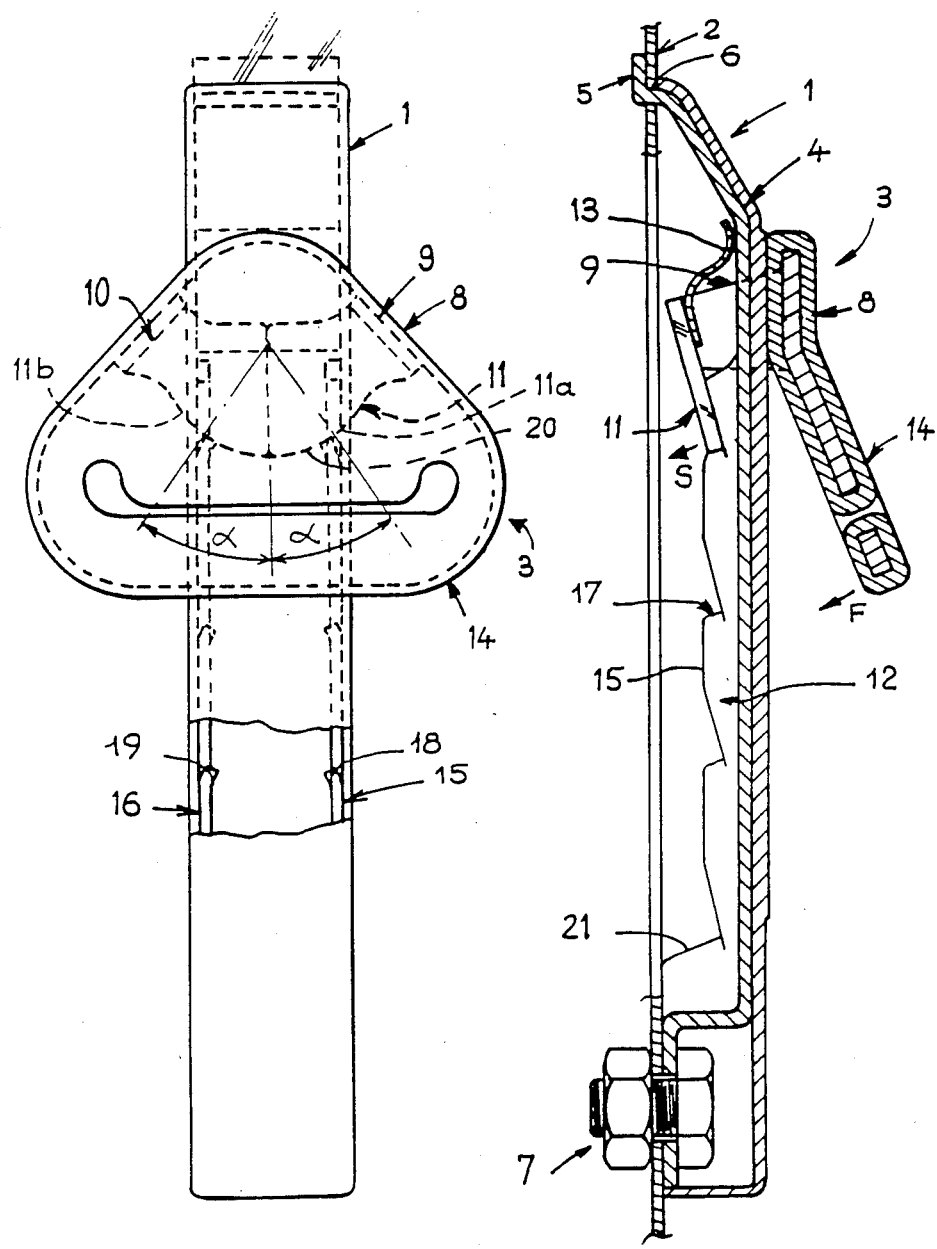

DEVICE FOR ADJUSTING THE POSITION OF A STRAP RETURN ELEMENT, IN PARTICULAR OF A SAFETY BELT FOR AN AUTOMOBILE VEHICLE

BACKGROUND OF THE INVENTION

The present invention relates to a device for adjusting the position of a strap return element in particular of a safety belt for an automobile vehicle.

In most vehicles, this strap return element is disposed on an anchoring pin fixed to the body of the vehicle at a height suitable for the majority of users of so called normal size.

However, this height is unsuitable for some users and in particular persons of small size.

To overcome this problem, a number of devices for adjusting the height of this strap return element are known in the art.

For example a device for adjusting the height of the anchoring point of a safety belt is known from the document FR.2 484 343 in which a slide moves along a screw-threaded support rod in the range of adjustment of the anchoring, said rod being rotatively mounted between the walls of a case fixed to an element of the body of the vehicle. The front side of this slide carries an anchoring member of the belt and its rear side carries an element for preventing the rotation of the slide which guides it along the inner wall of the case.

A device is also known from the document FR 2 488 201 for adjusting the height of a return element of a vehicle safety belt, comprising an adjusting element carrying the return element with a bolt which engages in stop notches of a rectilinear guide, it being possible to disengage the bolt by an actuating mechanism.

A device is also known from the document FR. 2 482 539 for adjusting the anchoring point of a safety belt disposed above the shoulder of an occupant of a vehicle, in which the anchoring point is carried by a slide cursor movably mounted in a slideway and capable of being immobilized by a catch which cooperates with a series of orifices provided in the slideway.

The document FR 2 513 887 discloses a device for adjusting the position and the height of the upper element of the shoulder belt of a safety belt. This device comprises a slideway integral with the body of the vehicle, and provided with a guide slot and openings in which penetrates at least one locking member mounted on a slide which carries the upper element and may be locked and unlocked by a manual actuating means.

The document F 2 543 838 discloses an anchoring device for the upper point of a safety belt, comprising a rail having a plurality of openings which are in two parts, and a locking lug which may be controlled by an actuating button. The adjustment of the position of the anchoring point is achieved by extracting the lug from the opening, shifting the slide and reintroducing the lug in another opening.

Lastly the document FR 2 536 288 discloses a device for adjusting the height of a safety belt for an automobile vehicle, constituted by a guide slideway having on both sides, locking openings disposed one above the other, and a carriage which is movable in the slideway, this carriage carrying a belt fixing or return element and including stop members which may be transversely shifted relative to the direction of movement of the carriage by means of a control member in opposition to the action of a spring for passing from a locking position to an unlocking position.

However, all these devices have a number of drawbacks, in particular as concerns the possibilities of adjustment, their relatively complex structure and consequently their relatively high manufacturing and assembly costs.

Furthermore, in most of the known devices, the locking means are biased to their locking position by elastic means which exert thereon a relatively large maintaining force. This obliges the user who wishes to shift the strap return element to exert on the means for shifting these locking means a relatively large force for shifting the locking means to their retracted position and thereby permit the shifting of the strap return element.

SUMMARY OF THE INVENTION

An object of the invention is therefore to solve the problems mentioned hereinbefore by providing a simple, rapid and precise device for adjusting the position of the strap return element for adapting the latter to the morphology of the user.

For this purpose the invention provides a device for adjusting the position of a strap return element in particular of a safety belt for an automobile vehicle, between two end positions, of the type comprising a guide rail integral with the post of the vehicle and on which is movable the strap return element, wherein said strap return element comprises a first planar portion from which extend two wings disposed on each side of the guide rail and between which wings is provided a blocking plate extending behind the rail, downwardly inclined toward the rear side of the rail, and adapted to cooperate with locking means provided on the rear side of the rail for locking the strap return element in position, elastic means being provided for biasing the blocking plate to the locking position and the first planar portion of the strap return element into bearing relation with the front side of the rail, the strap return element comprising a second portion angularly offset relative to the first portion and actuatable by a user for disengaging the blocking plate from the locking means and therefore shifting the strap return element.

A better understanding of the invention will be had from the following description which is given solely by way of example with reference to the accompanying drawings, in which:

BRIEF DESCRIPTION OF THE DRAWING

FIG. 1 is a section view of a device according to the invention,

FIG. 2 is a front elevational view of a device according to the invention.

DETAILED DESCRIPTION OF A PREFERRED EMBODIMENT

As can be seen in these Figures, an adjusting device according to the invention comprises a guide rail 1 integral with the post 2 of the vehicle and on which is movable a strap return element 3, for example of a safety belt of an automobile vehicle. This rail may be provided with covering means 4 of known type to improve the appearance of the assembly.

The rail is fixed to the post for example in the upper part of the latter by a bent portion of the rail 5 which engages in a cavity 6 provided in the post of the vehicle and in its lower part by a screw and nut assembly 7.

The belt return element 3 comprises a first planar portion 8 from which extend, as can be seen more clearly in FIG. 2, two wings 9 and 11 disposed on each side of the guide rail 1, and between which a blocking plate 11 is provided which extends behind the rail 1 and is downwardly inclined toward the rear side of the latter.

As can be seen more particularly in FIG. 1, this blocking plate 11 is adapted to cooperate with locking means 12 provided on the rear side of the rail for locking the belt return element 3 in position.

Elastic means 13 are also provided for biasing, on one hand, the blocking plate 11 to the locking position and, on the other hand, the first planar portion 8 of the strap return element to a position in which it bears against the front side of the rail 1.

The strap return element 3 further comprises a second portion 14 which is angularly offset relative to the first portion 8 of the element and this second portion is actuatable in a direction illustrated by the arrow F in FIG. 1 by a user in order to disengage the blocking plate 11 in the direction illustrated by the arrow S from the locking means 12 and thereby permit the shifting of the strap return element to another locked position.

The locking means 12 provided on the rear side of the rail 1 comprise for example two wings or ribs 15 and 16 extending in substantially parallel directions on the rear side of the rail and in which are formed notches for example 17 (FIG. 1) and 18, 19 (FIG. 2) adapted to cooperate with a corresponding portion of the locking plate 11 so as to lock the strap return element in position. Note that the ribs 15 and 16 may include a plurality of notches which are in confronting relation to each other and permit obtaining the corresponding number of locked positions of the strap return element.

As can be seen more particularly in FIG. 2 in which the notches 18 and 19 are shown to be provided respectively in the ribs 15 and 16, the bottom of the notches of each rib may be inclined in a direction toward the other rib so as to cooperate with a rounded portion 20 of the blocking plate, which permits a movement through an angle on each side of a mean position of the strap return element shown in FIG. 2 in order to improve the positioning of the strap.

The guide rail 1 may also include in its lower part an abutment surface 21 (FIG. 1) extending throughout the distance between the rail and the post of the vehicle to define a safety position of the strap return element in the event of for example the elastic means 13 breaking and no longer biasing the strap return element, and more particularly the blocking plate of the latter, in the locking means of the rail.

In a particularly advantageous embodiment, these elastic means 13 comprise a bent strip one of the ends of which is connected to the blocking plate 11 whereas the other end bears against the rear side of the rail for biasing the strap return element to a locked position.

The blocking plate 11 is advantageously formed by two symmetrical parts 11a and 11b (FIG. 2) which are fixed together in the region of their confronting edges and are in one piece with the wings 9 and 11 respectively.

The device according to the invention provides in a very simple manner various positions of adjustment enabling the user to adapt the height of the strap return element to his morphology.

Furthermore, the second portion 14 of the strap return element which is angularly offset relative to the first portion, enables the user to easily act on the strap return element for shifting it.

It must be understood that the device according to the invention could if desired allow only two positions of adjustment, namely an upper position and a lower position.

What is claimed is:

1. A device for adjusting the position of a strap-return element of a safety belt between two end positions, said device adapted to be mounted in particular on a post of an automobile vehicle, and said device comprising:

a guide rail adapted to be fixed to said post and having a front side and a rear side, which is adapted to face said post, said guide rail being provided with a rack-shaped locking means;

the strap return element comprising a first substantially planar portion and a second portion which is angularly offset relative to said first portion in a direction away from said front side of said guide rail; said first portion having two lateral wings extending toward said guide rail and located on each side of the latter, said first portion also comprising a blocking plate located between said wings and extending oppositely to said guide rail rear side and downwardly inclined toward the latter to cooperate with said rack-shaped locking means for locking said strap-return element in position; and elastic means, located between said blocking plate and said rail rear side and facing said first planar portion, for biasing said strap-return element so that, normally, said first planar portion bears against said rail front side and said blocking plate rests in contact, and in engagement, with said rack-shaped locking means, whereby, when said second portion is pushed in the direction of said rail front side against said elastic means bias, the strap-return element tilts about a junction of said first and second portion so that said first planar portion rotates away from said rail front side and so that said blocking plate is pivotally released from said rack-shaped locking means, thereby allowing shifting of said strap-return element along said guide rail.

2. A device according to claim 1, wherein the locking means provided on the rear side of the rail comprises two substantially parallel spaced-apart ribs in which ribs are formed notches cooperative with the blocking plate for locking the strap return element.

3. A device according to claim 2, wherein the notches of each rib have bottoms which are inclined in the direction toward the other rib.

4. A device acording to claim 1, wherein the blocking plate has a rounded portion adapted to cooperate with the locking means provided on the rail.

5. A device according to claim 1, wherein the rail has in a lower part thereof an abutment surface for maintaining the strap return element in a safety position.

6. A device according to claim 1, wherein the elastic means comprise a bent strip having one end portion connected to the blocking plate and an opposite end portion which is in bearing relation to the rear side of the rail.

7. A device according to claim 1, wherein the blocking plate comprises two symmetrical parts having confronting edges by which they are fixed together and form one piece with said wings.

* * * * *